United States Patent
Yokoyama et al.

(10) Patent No.: US 9,810,225 B2
(45) Date of Patent: Nov. 7, 2017

(54) TURBINE FOR TURBOCHARGER AND METHOD FOR ASSEMBLING TURBOCHARGER

(71) Applicant: MITSUBISHI HEAVY INDUSTRIES, LTD., Tokyo (JP)

(72) Inventors: Takao Yokoyama, Tokyo (JP); Motoki Ebisu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 525 days.

(21) Appl. No.: 14/347,980

(22) PCT Filed: Oct. 17, 2012

(86) PCT No.: PCT/JP2012/076805
§ 371 (c)(1),
(2) Date: Mar. 27, 2014

(87) PCT Pub. No.: WO2013/099410
PCT Pub. Date: Jul. 4, 2013

(65) Prior Publication Data
US 2014/0234091 A1    Aug. 21, 2014

(30) Foreign Application Priority Data

Dec. 27, 2011  (JP) ................. 2011-286968

(51) Int. Cl.
*F04D 17/10* (2006.01)
*F01D 9/02* (2006.01)
(Continued)

(52) U.S. Cl.
CPC ............ *F04D 17/10* (2013.01); *F01D 9/026* (2013.01); *F01D 25/24* (2013.01); *F02C 6/12* (2013.01);
(Continued)

(58) Field of Classification Search
CPC .......... F04D 17/10; F04D 29/12; F01B 25/02; F02C 6/12; F16C 33/01
See application file for complete search history.

(56) References Cited

U.S. PATENT DOCUMENTS 2,916,198 A      12/1959  Weisel
3,652,176 A  *   3/1972   Walsh ..................... F01D 5/043
                                                        415/182.1
(Continued)

FOREIGN PATENT DOCUMENTS

CN        101519997 A       9/2009
CN        101709667 A       5/2010
(Continued)

OTHER PUBLICATIONS

International Preliminary Report on Patentability and Written Opinion of the International Searching Authority (Forms PCT/IB/338, PCT/IB/326, PCT/IB/373 and PCT/ISA/237), dated Jul. 10, 2014, for International Application No. PCT/JP2012/076805, including English translation thereof.
(Continued)

*Primary Examiner* — Mark Laurenzi
*Assistant Examiner* — Shafiq Mian
(74) *Attorney, Agent, or Firm* — Birch, Stewart, Kolasch & Birch, LLP

(57) ABSTRACT

A turbocharger is of reduced size and easy to assemble. A rotor blade upstream flow channel space has a cylindrical portion that is gradually reduced in the downstream direction of exhaust gas flow corresponding with a reduction in volume of the scroll chamber. A back plate is formed so as to swell out toward the rotor blade gradually in the downstream direction corresponding with the reduction in volume of the scroll chamber. The back plate, at a termination end thereof, approaches the rotor blade and reaches a position adjacent to a leading edge of the rotor blade whereby the
(Continued)

flow channel space disappears substantially at this termination end.

8 Claims, 9 Drawing Sheets

(51) Int. Cl.
*F02C 6/12* (2006.01)
*F01D 25/24* (2006.01)
(52) U.S. Cl.
CPC ...... *F05D 2220/40* (2013.01); *F05D 2230/60* (2013.01); *Y10T 29/4924* (2015.01)

(56) References Cited

U.S. PATENT DOCUMENTS

| | | | | |
|---|---|---|---|---|
| 4,167,295 A * | 9/1979 | Glaser | ................ | F16C 17/042 384/105 |
| 4,565,505 A | 1/1986 | Woollenweber | | |
| 4,880,351 A * | 11/1989 | Inoue | ................... | F01D 17/165 415/159 |
| 4,928,489 A * | 5/1990 | Inoue | ................... | F02B 37/12 60/602 |
| 5,129,784 A * | 7/1992 | Yoshikawa | ......... | B23K 20/129 403/30 |
| 7,396,204 B2 * | 7/2008 | Shiraishi | ............... | F01D 17/165 29/889.2 |
| 8,425,182 B2 * | 4/2013 | Higashimori | ............ | F01D 1/08 415/156 |
| 8,641,380 B2 * | 2/2014 | McKenzie | ............... | C21D 7/04 416/185 |
| 8,784,036 B2 * | 7/2014 | Woollenweber | ........ | F01D 5/082 415/112 |
| 8,845,278 B2 * | 9/2014 | Higashimori | ............ | F01D 1/08 415/157 |
| 9,011,097 B2 * | 4/2015 | Yokoyama | ................ | F01D 1/28 416/183 |
| 9,556,738 B2 * | 1/2017 | Yamaguchi | ............. | B23K 1/00 |
| 2009/0220335 A1 * | 9/2009 | Matsuo | ................... | F01D 9/026 415/164 |
| 2010/0319344 A1 * | 12/2010 | Mckenzie | ............... | C21D 7/04 60/605.1 |
| 2011/0142604 A1 * | 6/2011 | Schumnig | ............... | F01D 25/24 415/170.1 |
| 2012/0003081 A1 * | 1/2012 | Woollenweber | ........ | F01D 5/082 415/180 |
| 2012/0163966 A1 * | 6/2012 | Higashimori | ............ | F01D 1/08 415/206 |
| 2013/0004321 A1 * | 1/2013 | Yokoyama | ................ | F01D 1/28 416/223 R |
| 2015/0037146 A1 * | 2/2015 | Yamaguchi | ........... | F01D 11/025 415/174.5 |
| 2015/0037159 A1 * | 2/2015 | Yamaguchi | ............... | B23K 1/00 416/204 A |

FOREIGN PATENT DOCUMENTS

| | | | | |
|---|---|---|---|---|
| DE | 10 2009 007 734 A1 | 8/2010 | | |
| EP | 1 790 829 A2 | 5/2007 | | |
| GB | 2463453 A | * | 3/2010 | ............ F01D 5/027 |
| GB | 2463453 A | | 3/2010 | |
| JP | 54-53705 A | | 4/1979 | |
| JP | 60-501016 A | | 7/1985 | |
| JP | 9-144550 A | | 6/1997 | |
| JP | 11-101128 A | | 4/1999 | |
| JP | 2005-30244 A | | 2/2005 | |
| JP | 2009-209701 A | | 9/2009 | |
| JP | 2010-209824 A | | 9/2010 | |
| JP | EP 2233720 A1 | * | 9/2010 | ........... F01D 17/146 |

OTHER PUBLICATIONS

International Search Report and Written Opinion of the International Searching Authority (Forms PCT/ISA/210, PCT/ISA/220 and PCT/ISA/237), dated Dec. 25, 2012, for International Application No. PCT/JP2012/076805, including English translation of International Search Report.
Extended European Search Report dated Jul. 22, 2015 issued in corresponding EP Application No. 12863532.3.
Decision to Grant a Patent dated Mar. 8, 2016 issued in the corresponding JP Application No. 2011-286968 with an English Translation.
Chinese Office Action and Search Report for Chinese Application No. 201280047614.4, dated Aug. 3, 2015, with an English translation.

* cited by examiner

A-A CROSS-SECTION

FIG. 7
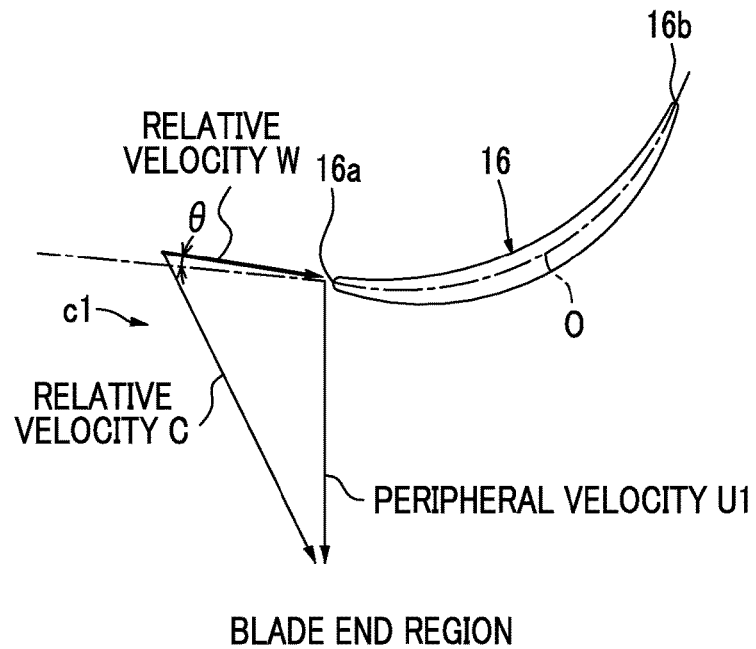
(A) BLADE END REGION
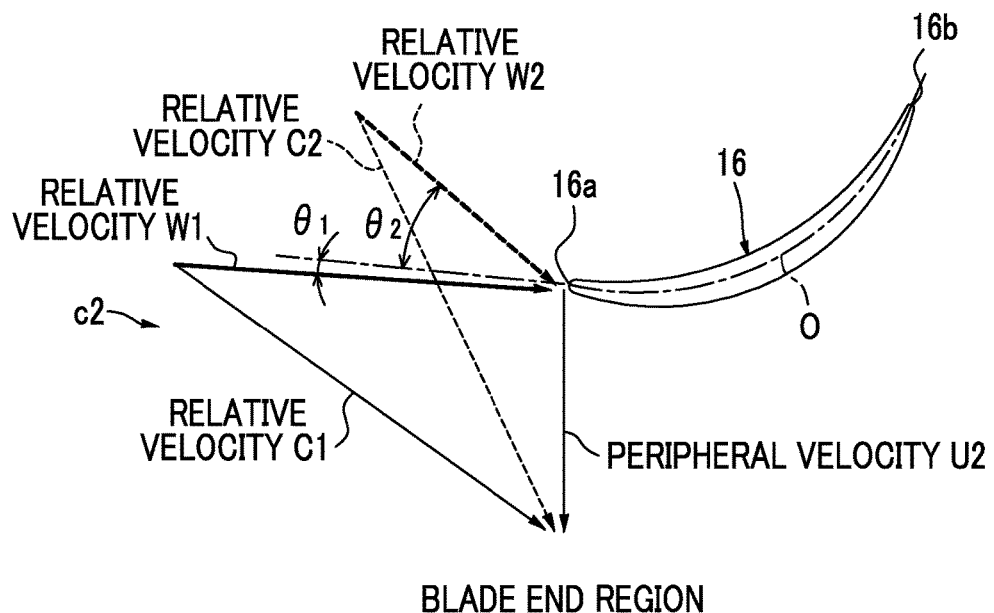
(B) BLADE END REGION

TURBINE FOR TURBOCHARGER AND METHOD FOR ASSEMBLING TURBOCHARGER

TECHNICAL FIELD

The present invention relates to a turbine for a turbocharger that can be reduced in size and weight and is easier to assemble, and a method for assembling a turbocharger incorporating the turbine for a turbocharger.

BACKGROUND ART

As turbines for turbochargers mounted on passenger cars, low-cost radial turbines have been mainly used. As shown in FIG. 11, in a radial turbine 100, a shaft end of a rotary shaft 102 is mounted with a turbine wheel 104. The turbine wheel 104 is constituted by a turbine disk 105 fixed to the rotary shaft 102, and a plurality of rotor blades 106 are provided to protrude outward in a radial direction from the turbine disk 105. A turbine housing 108 is provided so as to cover the turbine wheel 104. The turbine housing 108 is attached to a bearing housing 116 adjacent thereto with a cap 118.

The turbine housing 108 is constituted by a scroll portion 110 that has a spiral shape, and a cylindrical portion 112 that communicates with a spiral scroll chamber s formed inside the scroll portion 110 in a communication portion d. The turbine housing 108 on the upstream side of the rotor blades 106 is provided with an opening o that allows the rotor blades 106 to pass therethrough, and a back plate 114 that shields the opening o is detachably attached to the turbine housing 108. By removing the back plate 114, the rotary shaft 102 with the turbine wheel is enabled to leave and enter the turbine housing 108 through the opening o.

A swirling flow c that is directed to a circumferential direction of the turbine wheel 104 is formed in the scroll chamber s. The scroll portion 110 of the radial turbine 100 has a relatively large external diameter, and the area of the communication portion d is constricted. Accordingly, the swirling flow c within the scroll chamber s enters the inside of the cylindrical portion 112 at a large flow velocity, and rotates the rotor blades 106. Since the swirling flow c is formed within the scroll chamber s in this way, stator blades are unnecessary, and—cost reduction can be realized.

Meanwhile, in the radial turbine 100, in order to efficiently transmit the swirling force of the swirling flow c to the rotor blades 106, the rotor blades 106 are formed with swelling regions a that swell out outward in a radial direction toward the scroll chamber s. Therefore, a large moment of inertia is generated at the swelling regions a where the peripheral velocity increases during the rotation of the rotor blades 16.

FIG. 12 shows an axial-flow turbine. In an axial-flow turbine 120, a turbine wheel 124 is provided at a shaft end of a rotary shaft 122, and the turbine wheel 124 is constituted by a turbine disk 125 and rotor blades 126. A turbine housing 128 is provided so as to cover the turbine wheel 124, and the turbine housing 128 is constituted by an annular fluid inflow portion 130, and a cylindrical portion 132 that communicates with an inflow space S formed within the fluid inflow portion 130 through a communication portion d. Stator blades 136 are provided on an inner wall of the cylindrical portion 132 on the upstream side of the rotor blades 126. The communication portion d of the inflow space S is not constricted, forms a swirling flow c with the stator blades 136, and rotates the rotor blades 126 by the swirling flow c.

The axial-flow turbine is used for large-sized turbochargers for ships or the like, and the costs of it is high because the stator blades 136 has to be provided. However, since the axial-flow turbine forms the swirling flow with the stator blades 136, the scroll portion 130 can be made small. Further, since the rotor blades 126 are arranged inside the cylindrical portion 132, there is no generation of a large moment of inertia in the rotor blades 126.

Acceleration response at the start of vehicle is important for turbochargers mounted on passenger cars or the like, particularly on light vehicles. Therefore, an efficient rotation using a low flow rate of exhaust gas of the turbine wheel is necessary. Also, it is necessary to reduce the overall size and weight the turbochargers including the turbine wheel. In contrast, since the radial turbine has the swelling regions a at the rotor blades and the external diameter thereof becomes large, a large moment of inertia is generated. Therefore, there is a problem in that the response is not good. Meanwhile, since the stator blades are provided in the axial-flow turbine, it is necessary to insert the rotor blades from an outlet direction (a direction of arrow b in FIG. 12) during assembly, and the costs rise. Moreover, there are problems such that the dimension of the cylindrical portion 132 becomes large in the axial direction of the rotary shaft 122.

PTL 1 discloses a radial-type turbine for a turbocharger in which the reduction in size and weight is achieved to be used in passenger cars or the like. This turbine for a turbocharger will be simply described with reference to FIG. 13. In FIG. 13, in a turbine 140 for a turbocharger, a turbine wheel 144 fixed to a shaft end of a rotary shaft 142 is fixed. The turbine wheel 144 is constituted by a turbine disk 145 fixed to the shaft end of the rotary shaft 142, and a plurality of rotor blades 146 are provided to protrude outward in a radial direction from the turbine disk 145. A turbine housing 148 is provided so as to cover the turbine wheel 144, and the turbine housing 148 is constituted by a scroll portion 150 that has a spiral shape, and a cylindrical portion 152 in which the rotor blades 146 are accommodated.

In the turbine 140 for a turbocharger, the swelling regions that swell out outward in the radial direction are eliminated from leading edges 146a of the rotor blades 146, the leading edges 146a of the rotor blades 146 are formed obliquely with respect to the axial direction of the turbine wheel 144, and the inclination angle α thereof is made as large as 35° to 60°. Accordingly, the moment of inertia of the rotor blades 146 can be reduced, the centrifugal force of the rotor blades 146 is reduced, and the inflow of exhaust gas or the like from the scroll chamber S is made easy. Additionally, the rotor blades 146 are arranged inside the cylindrical portion 152, and the external diameter D thereof is made constant, whereby the turbine wheel 144 is enabled to leave and enter from an axial direction (a direction of arrow b) thereof during assembly. This allows the integration of the turbine housing 148. PTL 2 also discloses a turbine for a turbocharger that has the same configuration as that of PTL 1.

CITATION LIST

Patent Literature

[PTL 1]: Japanese Unexamined Patent Application Publication No. 9144550

[PTL 2]: PCT Japanese Translation Patent Publication

SUMMARY OF INVENTION

Technical Problem

In the turbines for a turbocharger disclosed in PTLs 1 and 2, the swelling regions of the rotor blades are eliminated, and the inclination angle is provided at the leading edges of the rotor blades. Therefore, the area of the rotor blades is reduced. Thus, there is a problem in that the swirling force of the swirling flow that flows in from the scroll chamber s cannot be efficiently transmitted to the rotor blades, and the efficiency of a turbocharger degrades. In order to recover the efficiency of the turbocharger, it is necessary to increase the area of the rotor blades on a trailing edge side, or to enlarge the scroll portion 150 to increase swirling energy of the swirling flow. However, this is counterproductive in terms of the size and weight reduction of the turbocharger.

Meanwhile, in the axial-flow turbine, the stator blades are attached to the inside of the turbine housing. Thus, the turbine wheel cannot be mounted before mounting the turbine housing during assembly. Therefore, the rotary shaft with the turbine wheel should be mounted on the bearding housing after the turbine housing is mounted on the bearing housing. Accordingly, there is a problem in that the attachment of the rotary shaft and the rotation balance test of the rotary shaft should be performed after the attachment of the turbine housing, and this work becomes difficult.

The invention has been made in view of the problems of the related art, and an object thereof is to provide a turbine for a turbocharger that can be reduced in size and weight and is easier to assemble while maintaining high response performance or the like required for a turbocharger for an automobile.

Solution to Problem

In order to achieve this object, a turbine for a turbocharger includes a rotary shaft that is rotatably journalled by a bearing; a turbine wheel including a turbine disk provided at a shaft end of the rotary shaft, and a plurality of rotor blades that are provided to protrude outward in a radial direction from the turbine disk; and a turbine housing including a scroll portion that is arranged so as to cover the turbine wheel and forms a swirling flow in a circumferential direction of the turbine wheel, and a cylindrical portion that guides the swirling flow formed by the scroll portion in an axial direction of the turbine wheel. The rotor blades are arranged in the cylindrical portion, and the scroll portion is formed so that an internal flow channel thereof communicates with a rotor blade upstream flow channel space of the cylindrical portion and the cross-section of the flow channel decreases gradually along the circumferential direction of the turbine wheel. A partition wall of the turbine housing that forms the rotor blade upstream flow channel space is formed so as to swell out gradually to a rotor blade side along the circumferential direction of the turbine wheel, and a termination end of the swelling portion swells out from the communication portion of the scroll portion to a position approaching the rotor blade side.

As such, by gradually reducing the rotor blade upstream flow channel space of the cylindrical portion in keeping with the scroll portion that is gradually reduced along the circumferential direction of the turbine wheel, the swirling energy of the swirling flow that flows into the rotor blade upstream flow channel space from the scroll portion can be made to act on the rotor blades without being attenuated. Therefore, a large rotative force can be applied to the rotor blades even if no stator blade is provided. Additionally, since it is not necessary to increase the surface area of the rotor blades or provide the swelling regions outward in the radial direction, the size and weight reduction and cost reduction of the turbine housing can be achieved. Additionally, by gradually reducing the rotor blade upstream flow channel space, the space of a turbine leading edge can be effectively used and the size of the scroll portion can be reduced.

Additionally, since it is not necessary to provide the rotor blades with the swelling regions that swell out outward in the radial direction, there is no generation of a large moment inertia in the rotor blades. Therefore, the response of the turbocharger can be maintained well. Additionally, since the termination end of the swelling portion formed on the rotor blade upstream partition wall of the turbine housing is configured so as to swell out from the communication portion of the scroll portion to the position approaching the rotor blade side, the swirling flow within the scroll portion does not remain in the scroll portion, and all the swirling flow can be delivered toward the rotor blades.

In the invention, the swelling portion in the partition wall of the turbine housing may swell out until the termination end thereof formed becomes adjacent to the rotor blades. Accordingly, the swirling energy of the swirling flow that flows into the rotor blades can be applied to the rotor blades to the maximum, and the efficiency of a turbocharger can be further improved.

In the invention, the turbine housing on the upstream side of the turbine blades may be formed with an opening that allows the rotor blades to pass therethrough, and a shielding wall that shields the opening may be detachably mounted on the turbine housing. Additionally, the turbine wheel is enabled to leave and enter the turbine housing from the upstream side of the rotor blades, and the assembly of the turbocharger is made easy. In addition, if the external diameter of the rotor blades is made smaller than an inner wall surface of the cylindrical portion, the turbine wheel is enabled to leave and enter the turbine housing from both sides in the axial direction, and the assembly of the turbocharger is made easier.

In the invention, a rib that corrects a flow direction of the swirling flow, which flows along a surface of the partition wall and flows into blade root regions of the rotor blades, to a direction in which the angle of impact with respect to the rotor blades is made small, may be provided to protrude from a surface of the partition wall that forms the rotor blade upstream flow channel space of the turbine housing. Accordingly, there is an efficient rotation of the rotor blades by the swirling flow that flows into the blade root regions of the rotor blades through the rib, and the efficiency of a turbocharger is further improved. Therefore, the size and weight of the turbine housing can be further reduced.

The method for assembling a turbocharger of the invention is a method for assembling a turbocharger in which the turbine for a turbocharger of the invention is incorporated. The method includes a first step of assembling the rotary shaft, having the turbine wheel provided at one end, to a bearing housing; a second step of fixing a compressor wheel to the other end of the rotary shaft; a third step of correcting a rotation balance of the rotary shaft after the second step; and a fourth step of attaching a compressor housing and the turbine housing to the bearing housing.

Since the stator blades can be eliminated from the turbine for a turbocharger of the invention, the attachment of the rotary shaft with the turbine wheel to the bearing housing can be performed before the attachment of the turbine housing to the bearing housing. Therefore, the attachment of the rotary shaft is easy to accomplish. Additionally, the rotation balance test of the rotary shaft after the turbine wheel and the compressor wheel are attached can be performed before the turbine housing and the compressor housing is attached to the bearing housing. Accordingly, since the rotation balance test can be easily and precisely done, the correction of the rotation balance can be easily and precisely done.

Advantageous Effects of Invention

According to the turbine for a turbocharger of the invention, the partition wall of the turbine housing that forms the rotor blade upstream flow channel space of the cylindrical portion is formed so as to swell out gradually to the rotor blade side along the circumferential direction of the turbine wheel in accordance with the shape of the scroll portion. Thus, the swirling force of the swirling flow of the scroll portion can be made to act on the rotor blades without being attenuated. Therefore, since a large swirling force can be applied to the rotor blades even if no stator blade is provided, the size and weight reduction and cost reduction of the turbine housing can be achieved. Additionally, since it is not necessary to provide the rotor blades with the swelling regions, the moment of inertia of the rotor blades can be reduced, and therefore, the response of the turbocharger can be maintained well. Additionally, by gradually reducing the rotor blade upstream flow channel space, the space of the turbine leading edge can be effectively used and the size of the scroll portion can be reduced.

According to the method for assembling a turbocharger of the invention, the attachment of the rotary shaft with the turbine wheel and the compressor wheel and the rotation balance test of the rotary shaft can be performed before the turbine housing and the compressor housing can be assembled. Therefore, since the attachment of the rotary shaft with the turbine wheel or the compressor wheel and the rotation balance test becomes easy, and since a precise test is enabled, the correction of the rotation balance can be easily and precisely performed.

BRIEF DESCRIPTION OF DRAWINGS

FIG. 7(A) is an explanatory view showing the impact angle of exhaust gas in a rotor blade tip region in the second embodiment, and FIG. 7(B) is an explanatory view showing the impact angle of exhaust gas that flows into a rotor blade root region.

DESCRIPTION OF EMBODIMENTS

Figure 1:
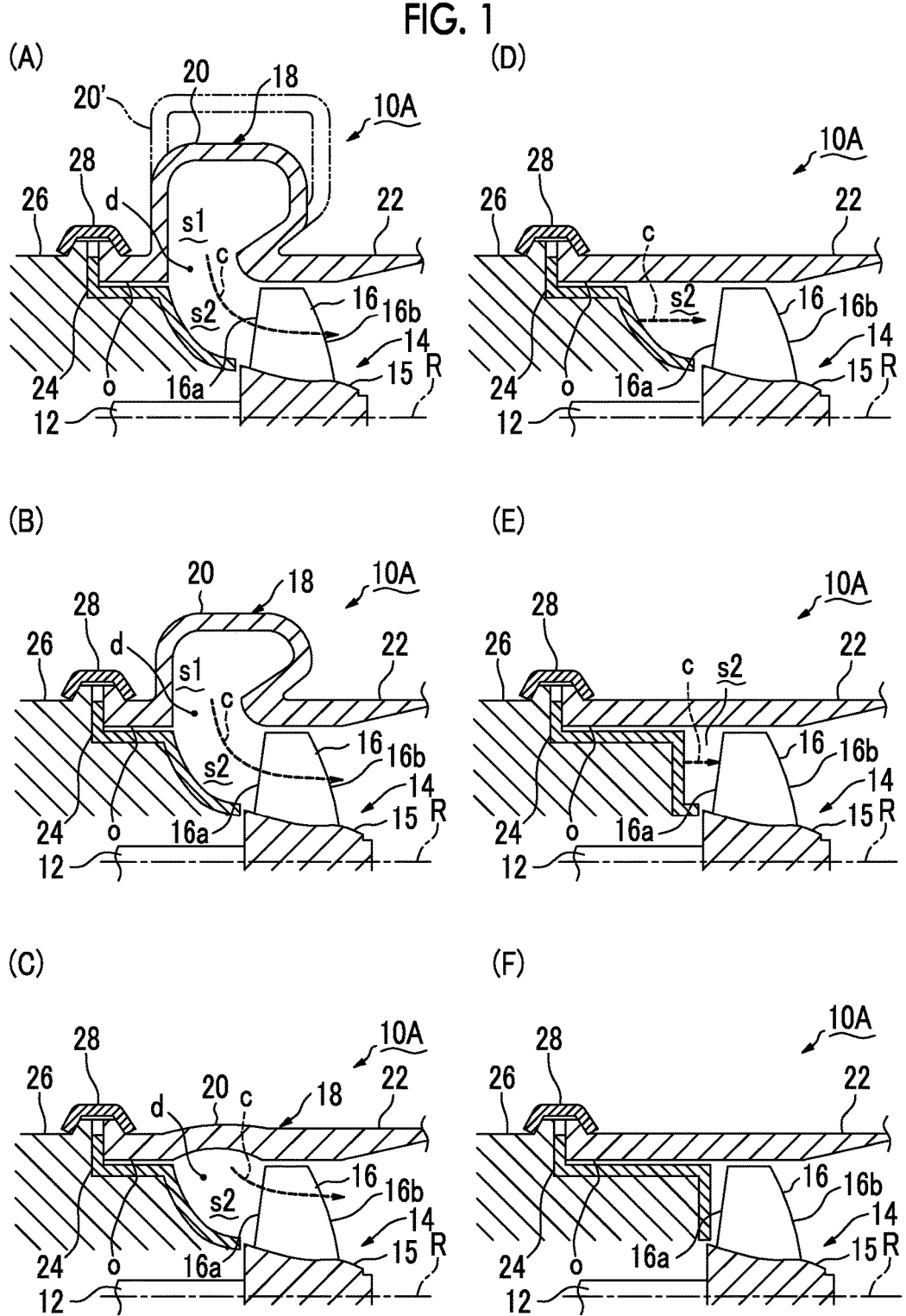
FIGS. 1(A) to 1(F) are cross-sectional views in a front view showing a turbine for a turbocharger related to a first embodiment of the invention, which is cut in order along a swirling direction of exhaust gas.

Hereinafter, the invention will be described in detail with the reference to the embodiments shown in the drawings. However, unless otherwise specified, the dimensions, materials, shapes, relative arrangements, or the like of component parts described in the embodiments are not intended to limit the scope of the invention.

Embodiment 1

Figure 2:
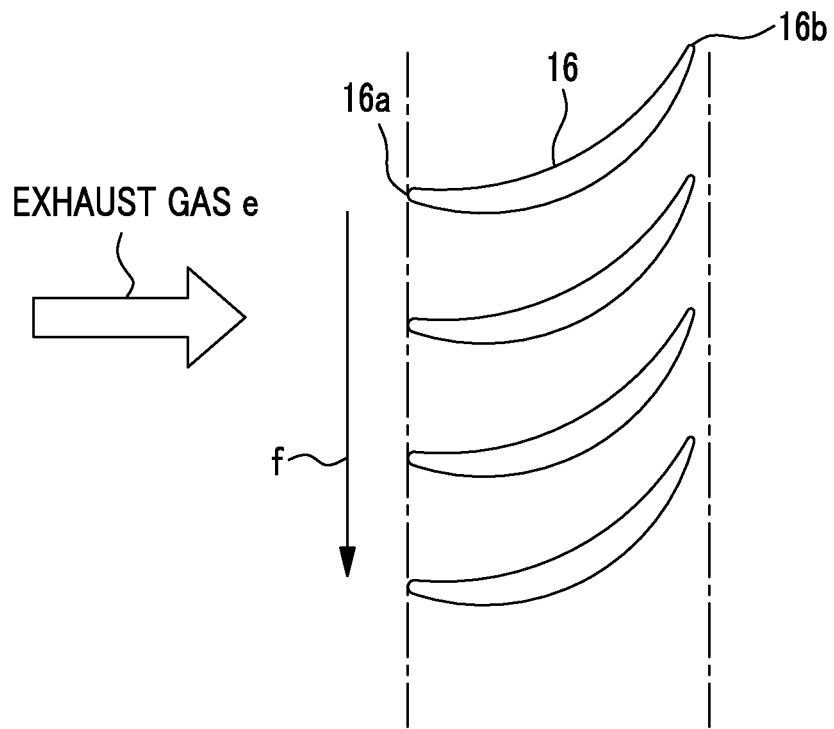
FIG. 2 is a development view of rotor blades that constitute the turbine for a turbocharger of the first embodiment.

A first embodiment in which a turbine for a turbocharger of the invention is applied to a turbocharger for an automobile will be described with reference to FIGS. 1 and 2. Referring to FIG. 1, in a turbine 10A for a turbocharger of the present embodiment, a shaft end of a rotary shaft 12 is mounted with a turbine wheel 14. The turbine wheel 14 is constituted by a turbine disk 15 fixed to the rotary shaft 12, and a plurality of rotor blades 16 are provided to protrude at equal intervals outward in a radial direction from the turbine disk 15. A turbine housing 18 is provided outside the rotor blades 16 so as to cover the turbine wheel 14. The size of tip of the rotor blades 16 is made smaller than the diameter of an inner wall of a cylindrical portion 22, and the rotor blades 16 is arranged inside the cylindrical portion 22.

The turbine housing 18 is constituted by a scroll portion 20 having a spiral shape and the cylindrical portion 22. The turbine housing 18 is combined with a bearing housing 2 with a cap 28. A scroll chamber s1 formed inside the scroll portion 20 communicates with the cylindrical portion 22 in a communication portion d located in the cylindrical portion 22 on an upstream side of the rotor blades 16. The turbine housing 14 on the upstream side of the rotor blades 16 is provided with an opening o that allows the rotor blades 16 to pass therethrough. A partition wall is provided in the form of a back plate 24 that shields the opening o is detachably attached to the turbine housing 18 and the bearing housing 26.

Exhaust gas e that has flowed into the scroll chamber s1 forms a swirling flow c that is directed to a circumferential direction of the turbine wheel 14, and flows into the cylindrical portion 22 on the upstream side of the rotor blades 16. The exhaust gas e that has flowed into the cylindrical portion 22 reaches the rotor blades with a swirling force held, and rotates the rotor blades 16 in a direction of arrow f around a rotation axis R (refer to FIG. 2). FIG. 1 is a cross-sectional view cut in order from the upstream side toward a downstream side in the swirling direction of the exhaust gas e that flows through the scroll chamber s1. The cross-sectional area of the scroll chamber s1 is gradually reduced as shown in FIGS. 1(A) to 1(C), and eventually disappears as shown in FIG. 1(D).

A rotor blade upstream flow channel space s2 of the cylindrical portion 22 is formed by the back plate 24. The flow channel space s2 is also gradually reduced from the upstream side toward the downstream side in the swirling direction of the exhaust gas e in accordance with the reduction in volume of the scroll chamber s1. That is, as shown in FIG. 1, the back plate 24 is formed so as to swell out to a rotor blade side gradually from the upstream side toward the downstream side in the swirling direction of the exhaust gas e in accordance with the reduction in volume of the scroll chamber s1. The swelling portion of the back plate 24 approaches the rotor blades 16 beyond the communication portion d, and as shown in FIG. 1(F), reaches the position adjacent to a leading edges 16a of the rotor blades 16 at a termination end thereof. Therefore, the flow channel space s2 disappears substantially at this termination end.

In this configuration, the exhaust gas e that has become the swirling flow in the scroll chamber s1 flows into the rotor blade upstream flow channel space s2 of the cylindrical portion 22 from the communication portion d. Since the back plate 24 swells out gradually along the swirling direction of the swirling flow c in the flow channel space s2, the exhaust gas e flows along the surfaces of the rotor blades 16 from the leading edges 16a to trailing edges 16b in the rotor blades 16 with its swirling force being not attenuated, applies a rotative force to the rotor blades 16 during this flow, and rotates the rotor blades 16.

According to the present embodiment, since the back plate 24 is formed along the swirling direction of the swirling flow c so as to swell out gradually to the rotor blade side, the swirling flow c with increased flow velocity can be applied to the rotor blades 16 without attenuating the swirling force. This can efficiently rotate the rotor blades 16 and can improve the efficiency of a turbocharger. Therefore, since the stator blades can be made unnecessary, cost reduction can be achieved, and it is not necessary to increase the surface area of the rotor blades 16 or provide the swelling regions a outward in the radial direction, the size and weight reduction and cost reduction of the turbine housing 18 can be achieved. Additionally, by gradually reducing the rotor blade upstream flow channel space s2, the space of the turbine leading edge can be effectively used and the size of the scroll portion 20 can be reduced.

That is, the scroll portion 20 of the present embodiment can be reduced, as shown in FIG. 1 (A), compared to the size of a scroll portion 20' of a radial turbine of the related art. In the present embodiment, since the swelling portion swells out until the swelling portion becomes adjacent to the rotor blades 16 at the termination end of the swelling portion as shown in FIG. 1(F), the efficiency of a turbocharger can be improved to the maximum.

Additionally, since it is not necessary to provide the rotor blades 16 with the swelling regions a that swell out outward in the radial direction unlike the radial turbine of the related art, there is no generation of a large moment of inertia in the rotor blades 16. Therefore, the response of the turbocharger can be maintained well. Additionally, the turbine wheel 14 is enabled to leave and enter the turbine housing 18 in both directions in the axial direction, and the assembly of the turbocharger is made easy.

Figure 3:
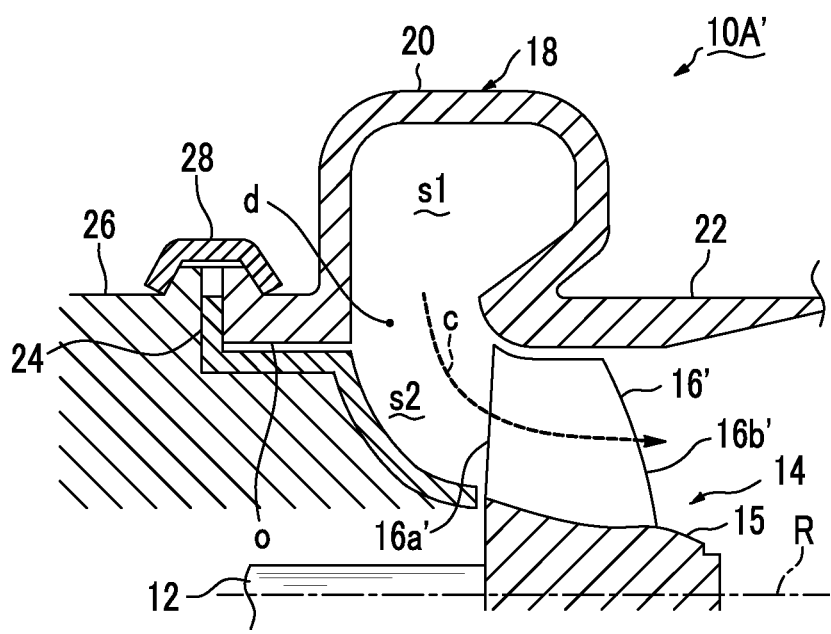
FIG. 3 shows a modification example of the first embodiment.
Figure 4:
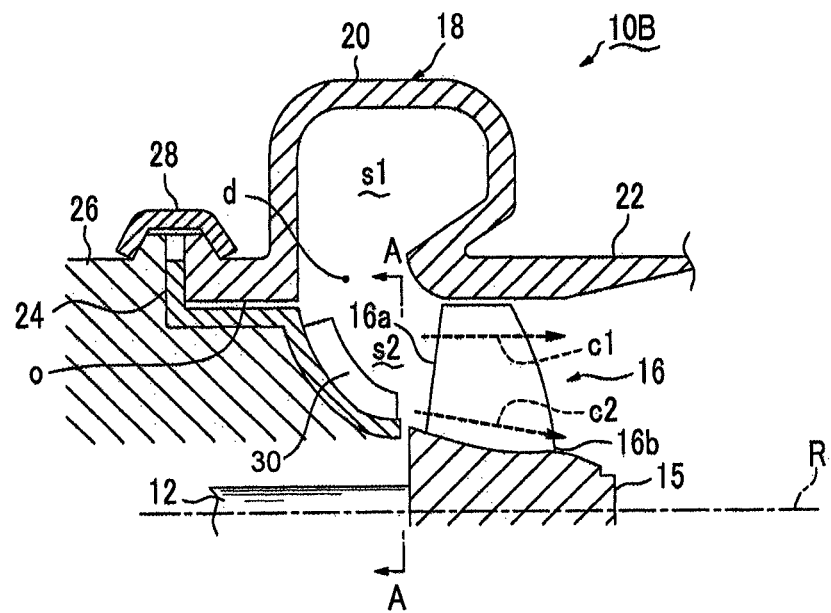
FIG. 4 is a cross-sectional view in a front view related to a second embodiment of the turbine for a turbocharger related to the invention.

Next, a modification example of the first embodiment will be described with reference to FIG. 3. In a turbine 10A' for a turbocharger related to the present modification example, leading edges 16a' of rotor blades 16' extend to the upstream side compared to the first embodiment, and outer tips of the leading edges 16a' protrude outward along the curve of the inner wall of the cylindrical portion 22. Accordingly, the tip diameter of the leading edges 16a' becomes larger than the diameter of the inner wall of the cylindrical portion 22, but is smaller than the diameter of the opening o. Therefore, only the exit and entrance of the turbine wheel 14 through the opening o side with respect to the turbine housing 18 are allowed. Trailing edges 16b' of the rotor blades have the same shape as the trailing edges 16b of the rotor blades 16 of the first embodiment. The other configuration is the same as that of the first embodiment.

According to the present modification example, since the leading edges 16a' of the rotor blades 16' extend to the upstream side and the tip diameter of the outer side of the leading edges 16a' is enlarged, a large swirling force can be applied to the swirling flow c, suppressing an increase in moment of inertia compared to the first embodiment. Additionally, since the turbine wheel 14 is able to exit and enter through the opening o, the assembly of the turbocharger is made easy.

Embodiment 2

Figure 5:
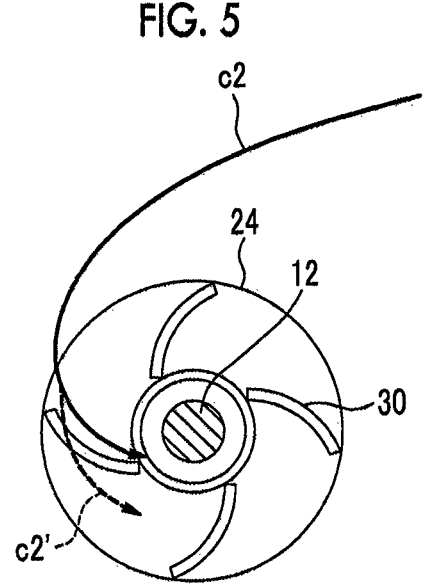
FIG. 5 is a cross-sectional view taken along line A-A in FIG. 4.
Figure 6:
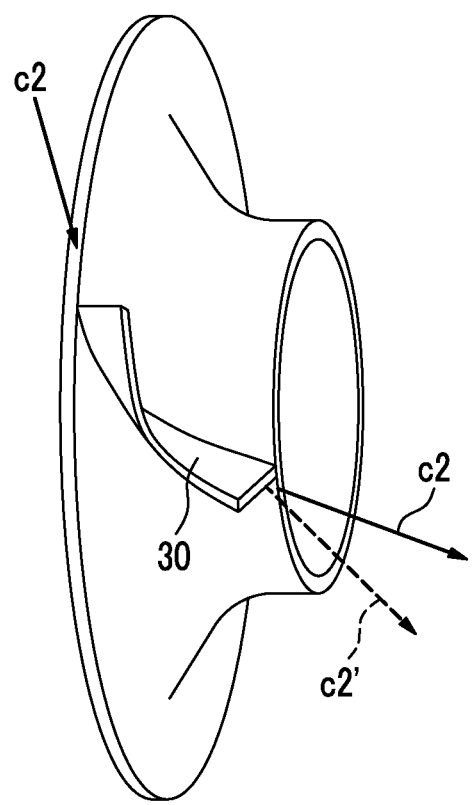
FIG. 6 is a perspective view of a back plate that constitutes the turbine for a turbocharger of the second embodiment.

Next, a second embodiment in which the turbine for a turbocharger of the invention is applied to a turbocharger for an automobile will be described with reference to FIGS. 4 to 7. A turbine 10B for a turbocharger of the present embodiment includes all the configurations of the turbine 10A for a turbocharger of the first embodiment. In addition, the turbine for a turbocharger has the configuration to be described below. As shown in FIG. 5, four swirling preventing ribs 30 are fixed to the surface of the back plate 24, which forms the flow channel space s2, at equal intervals. In addition, FIG. 6 illustrates one swirling preventing rib 30, and omits illustration of the other swirling preventing ribs 30.

The swirling preventing ribs 30 are arranged from the outer edge of the back plate 24 toward the center thereof, and has a curved surface with a large curvature radius. A swirling flow c2 (refer to FIGS. 4 and 5), which flows into the flow channel space s2 from the scroll chamber s1 and passes through the vicinity of the surface of the back plate 24, is directed to a direction of a dashed line c2', when there is no swirling preventing rib 30. If the swirling preventing ribs 30 are present, the swirling flow c2 is corrected so as to be directed to a center side (a direction of a solid line c2) of a back plate 24.

FIG. 7(A) shows the inflow direction and inflow velocity of the swirling flow c1 that flow into a blade tip region of a rotor blade 16. Although the swirling flow c1 flows into the leading edge 16a of the rotor blade 16 at an absolute velocity C, since the tip region of the rotor blade 16 rotates at a peripheral velocity U1, the swirling flow c1 actually flows into the leading edge 16a with a direction and magnitude shown by a relative velocity W. Since the peripheral velocity U1 is larger compared to the absolute velocity C in the blade tip region, the swirling flow c1 flows into the leading edge 16a at a small impact angle θ (an angle formed with respect to a line obtained by extending the centerline O of the rotor blade 16 from the leading edge 16a to the upstream side). Therefore, a rotative force can be efficiently applied to the rotor blade 16 from the swirling flow c1.

FIG. 7(B) shows the inflow direction and inflow velocity of the swirling flow c2 that flow into the blade root region of the rotor blade 16. When there is no swirling preventing rib 30, the swirling flow c2 flows into the leading edge 16a at an absolute velocity C2. However, since the blade root region of the rotor blade 16 rotates at a peripheral velocity U2, the swirling flow c2 actually flows into the leading edge 16a with a direction and magnitude by a relative velocity W2. Since the peripheral velocity U2 becomes smaller compared to the absolute velocity C2 in the blade root region, the impact angle θ2 of the swirling flow c2 becomes large, and a rotative force cannot be efficiently applied to the rotor blade 16 from the swirling flow c2. On the other hand, when the swirling preventing ribs 30 are attached, the direction of the swirling flow c2 can be changed by the swirling preventing ribs 30. Therefore, the impact angle θ1 of the swirling flow c2 can be made small. Therefore, a rotative force can be efficiently applied to the rotor blade 16 from the swirling flow c2.

According to the present embodiment, in addition to the functional effects obtained in the first embodiment, the impact angle of the swirling flow c that flows into the leading edges 16a of the rotor blades 16 can be made small, and thereby, a rotative force can be efficiently applied to the rotor blades 16 from the swirling flow c in the blade root regions of the rotor blades 16. In addition, in the present embodiment, the four swirling preventing ribs 30 are provided at equal intervals at the back plate 24. In the invention, however, the number and positions of the swirling preventing ribs 30 to be attached are not limited to this.

Embodiment 3

Figure 8:
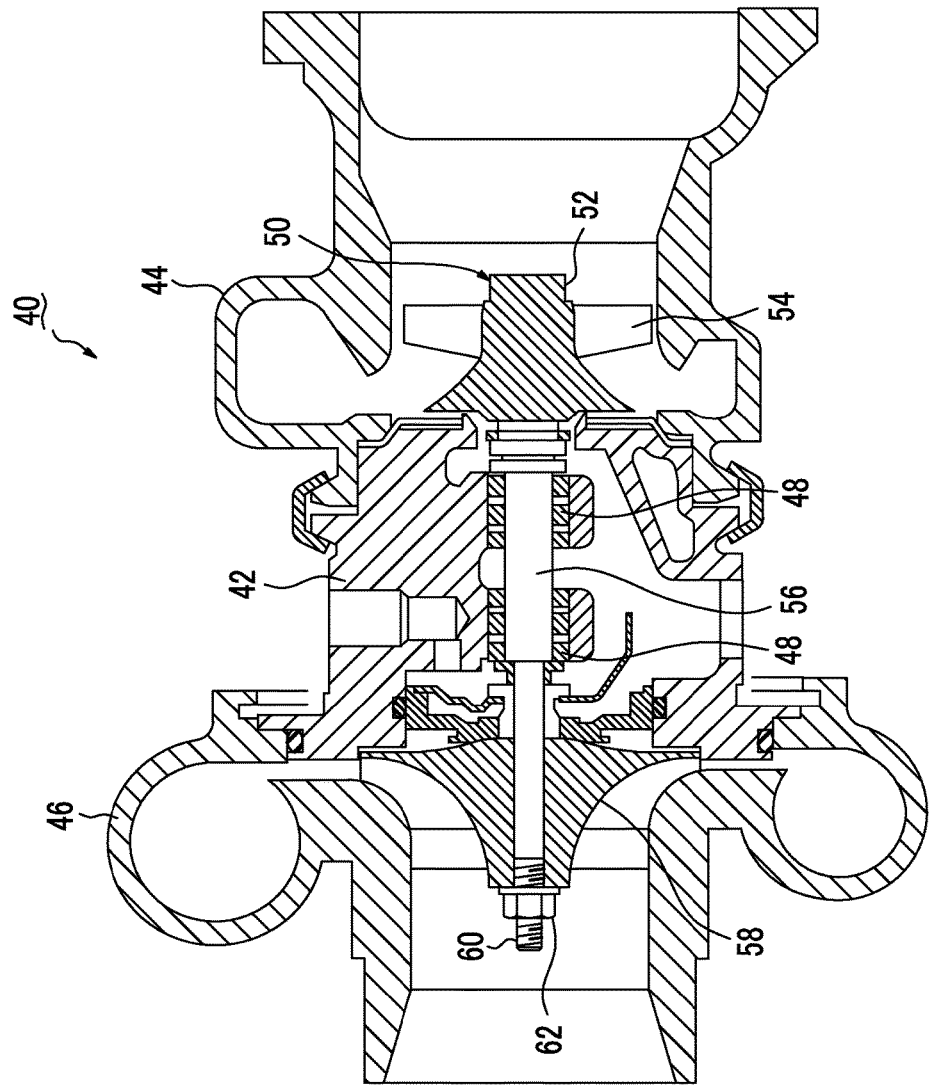
FIG. 8 is a cross-sectional view in a front view of a turbocharger after assembly, which is related to the first embodiment of the method for assembling a turbocharger related to the invention.
Figure 9:
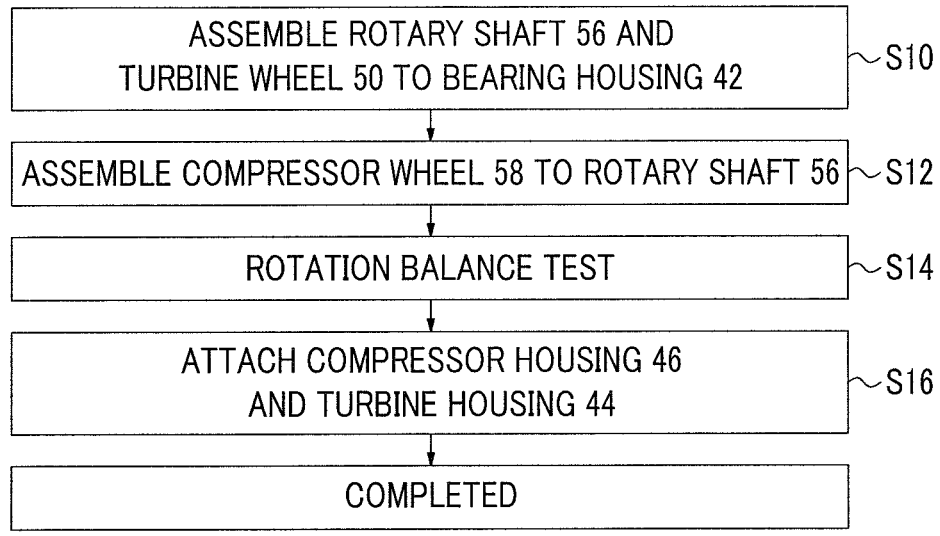
FIG. 9 is a process diagram showing an assembly procedure related to the first embodiment of the method of the invention.

Next, an embodiment of a method for assembling a turbocharger related to the invention will be described in FIGS. 8 to 10. FIG. 8 shows a turbocharger 40 for an automobile after assembly into which a turbine for a turbocharger of the invention is incorporated. In the turbocharger 40, a turbine housing 44 and a compressor housing 46 are mounted on a bearing housing 42, which is provided at the center of the turbocharger, from both sides. A rotary shaft 56 is rotatably supported by two bearings 48 provided inside the bearing housing 42. A turbine wheel 50 is attached to a shaft end of the rotary shaft 56. The turbine wheel 50 is constituted by a turbine disk 52 fixed to the rotary shaft 56, and a plurality of rotor blades 54 are provided to protrude outward in a radial direction from the turbine disk 52. A compressor wheel 58 is mounted on the other end of the rotary shaft 56 with a bolt 60.

Next, an assembly procedure of the turbocharger 40 by the present embodiment will be described with reference to FIG. 9. In FIG. 9, first, the rotary shaft 56 and the turbine wheel 50 is assembled to the bearing housing 42 (Step S10). Next, the compressor wheel 58 is mounted on the rotary shaft 56 with the bolt 60 (Step S12). Next, the rotation balance test of the rotary shaft 56 is performed, and the rotation balance of the rotary shaft 56 is corrected (Step S14). Next, the compressor housing 46 and the turbine housing 44 are attached to the bearing housing 42 (Step S16).

According to the method for assembling the present embodiment, since no stator blade is attached to the turbine housing 44, the rotary shaft 56 to which the turbine wheel 50 is attached can be mounted on the bearing housing 42 before the turbine housing 44 is attached. Therefore, the rotation balance test of the rotary shaft 56 can be performed before the compressor housing 46 and the turbine housing 44 are attached. Accordingly, since the rotation balance test can be easily performed and a precise test is enabled, the correction of the rotation balance can be easily and precisely performed.

Figure 10:
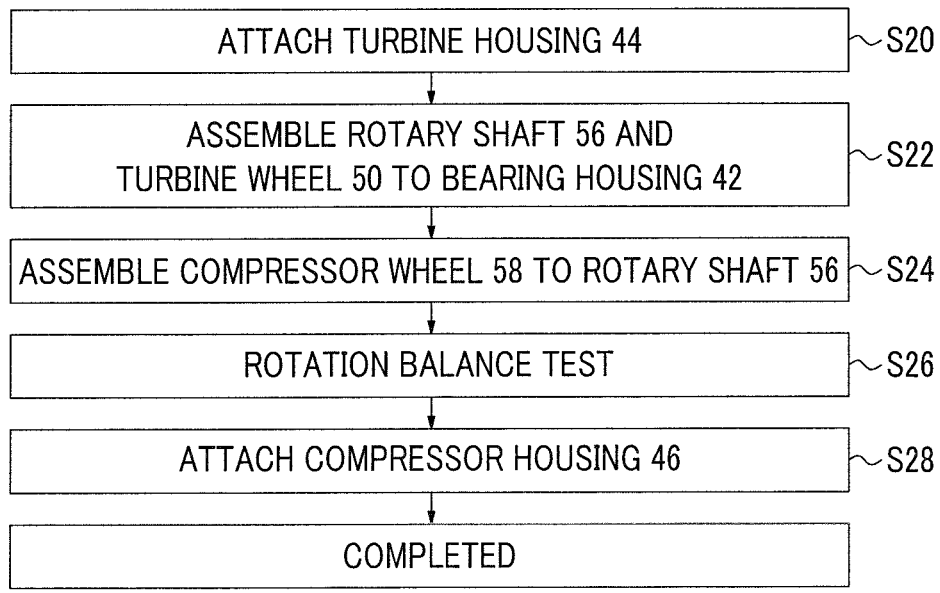
FIG. 10 is a process diagram showing an assembly procedure of a turbocharger as a comparative example.
Figure 11:
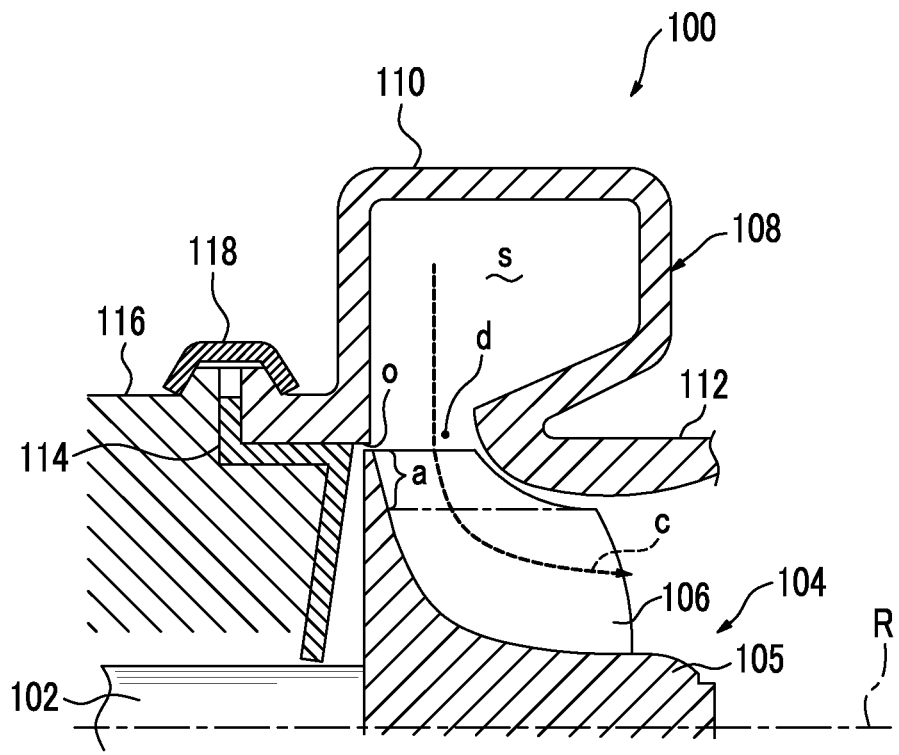
FIG. 11 is a cross-sectional view in a front view of a radial turbine.
Figure 12:
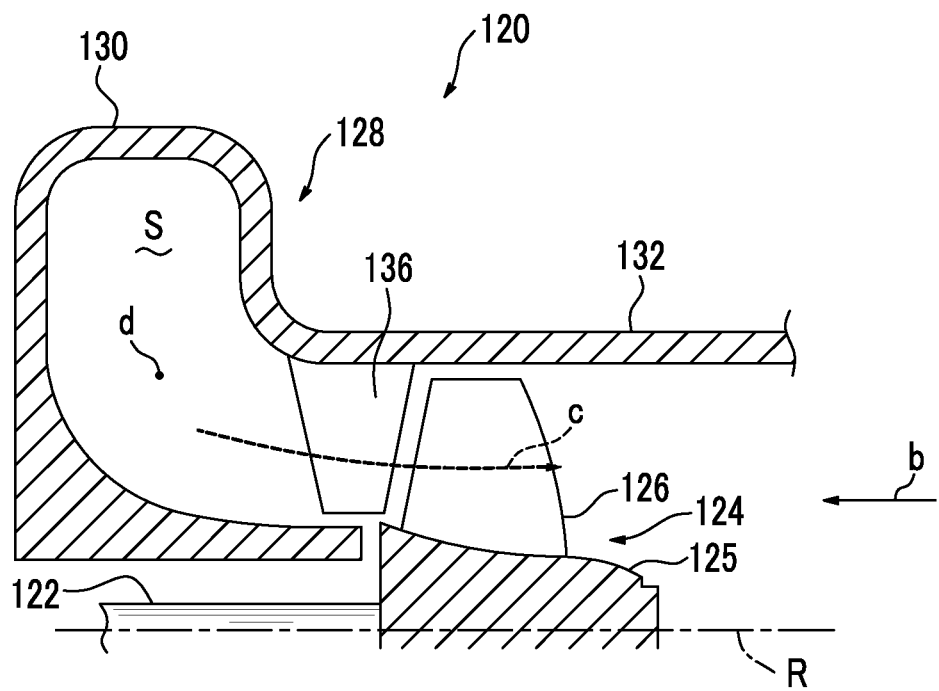
FIG. 12 is a cross-sectional view in a front view of an axial-flow turbine.
Figure 13:
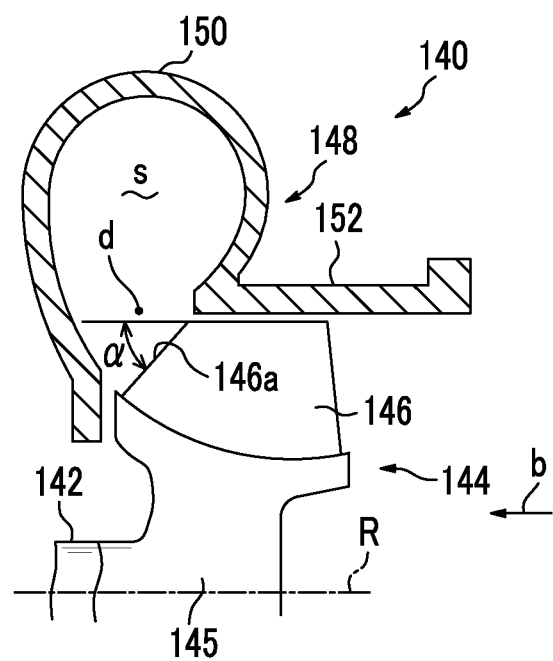
FIG. 13 is a cross-sectional view in a front view of a turbine for a turbocharger of the related art.

FIG. 10 shows an assembly procedure of an axial-flow turbine of the related art as a comparative example. In FIG. 10, first, the turbine housing is attached to the bearing housing (Step S20). Next, a rotary shaft with a turbine wheel is rotatably journalled to the bearing housing (Step S22). Next, the compressor wheel is fixed to the rotary shaft (Step S24). Next, the rotation balance test of the rotary shaft 56 is performed, and the rotation balance of the rotary shaft 56 is corrected (Step S26). Next, the compressor housing is attached to the bearing housing (Step S28).

In the axial-flow turbine, the stator blades are attached to the inside of the turbine housing. Thus, it is necessary to attach the turbine wheel after attaching the turbine housing is attached to the bearing housing. Therefore, the rotation balance test of the rotary shaft should be performed after the turbine housing is attached. Accordingly, attachment work of the turbine wheel and the rotary shaft or the rotation balance test of the rotary shaft become difficult. Meanwhile, according to the assembling method of the present embodiment, such difficulty can be solved.

INDUSTRIAL APPLICABILITY

According to the invention, it is possible to realize a turbine for a turbocharger that can be reduced in size and weight and is easier to assemble while maintaining high response performance or the like required for a turbocharger for an automobile.

The invention claimed is:

1. A turbine for a turbocharger comprising:
a rotary shaft that is rotatably journaled by a bearing;
a turbine wheel including a turbine disk provided at a shaft end of the rotary shaft, and a plurality of rotor blades that are provided to protrude outward in a radial direction from the turbine disk;
a turbine housing including a scroll portion, the scroll portion being arranged so as to cover the turbine wheel and form a swirling flow in a circumferential direction of the turbine wheel, and a cylindrical portion that guides the swirling flow formed by the scroll portion in an axial direction of the turbine wheel,
wherein the rotor blades are arranged in the cylindrical portion, and
an upstream flow channel space in said cylindrical portion is located upstream of leading edges of the rotor blades in the axial direction of the turbine wheel and downstream of said scroll portion,
wherein the scroll portion is formed so that an internal flow channel thereof communicates with the upstream flow channel space of the cylindrical portion and the cross-section of the upstream flow channel space decreases gradually along the circumferential direction of the turbine wheel, and
wherein a partition wall that forms the rotor blade upstream flow channel space is formed so as to swell out gradually in an axial direction to a rotor blade side along the circumferential direction of the turbine wheel, and a termination end of the swelling portion swells out from the communication portion of the scroll portion to a position approaching the rotor blade side.

2. The turbine for a turbocharger according to claim 1, wherein the swelling portion swells out until the termination end thereof becomes adjacent to the rotor blades.

3. The turbine for a turbocharger according to claim 1, wherein the turbine housing is formed with an opening that allows the rotor blades to pass therethrough, and wherein the partition wall is a back plate that shields the opening and is detachably mounted on the turbine housing.

4. The turbine for a turbocharger according to claim 1, wherein a rib that corrects a flow direction of the swirling flow, which flows along a surface of the partition wall and flows into blade root regions of the rotor blades, to a direction in which the angle of impact with respect to the rotor blades is made small, is provided to protrude from a surface of the partition wall that forms the rotor blade upstream flow channel space of the turbine housing.

5. A method for assembling a turbocharger in which the turbine for a turbocharger according to claim 1 is incorporated, the method comprising:
   a first step of assembling the rotary shaft, having the turbine wheel provided at one end, to a bearing housing;
   a second step of fixing a compressor wheel to the other end of the rotary shaft;
   a third step of correcting a rotation balance of the rotary shaft after the second step; and
   a fourth step of attaching a compressor housing and the turbine housing to the bearing housing.

6. The turbine for a turbocharger according to claim 2, wherein the turbine housing is formed with an opening that allows the rotor blades to pass therethrough, and wherein the partition wall is a back plate that shields the opening and is detachably mounted on the turbine housing.

7. The turbine for a turbocharger according to claim 2, wherein a rib that corrects a flow direction of the swirling flow, which flows along a surface of the partition wall and flows into blade root regions of the rotor blades, to a direction in which the angle of impact with respect to the rotor blades is made small, is provided to protrude from a surface of the partition wall that forms the rotor blade upstream flow channel space of the turbine housing.

8. A method for assembling a turbocharger in which the turbine for a turbocharger according to claim 2 is incorporated, the method comprising:
   a first step of assembling the rotary shaft, having the turbine wheel provided at one end, to a bearing housing;
   a second step of fixing a compressor wheel to the other end of the rotary shaft;
   a third step of correcting a rotation balance of the rotary shaft after the second step; and
   a fourth step of attaching a compressor housing and the turbine housing to the bearing housing.

\* \* \* \* \*